US008215266B2

(12) United States Patent
Tarbutton

(10) Patent No.: US 8,215,266 B2
(45) Date of Patent: Jul. 10, 2012

(54) BATHING TUB FOR PETS

(75) Inventor: Charles Stanley Tarbutton, Easton, MD (US)

(73) Assignee: Chuck, LLC, Easton, MD (US)

( * ) Notice: Subject to any disclaimer, the term of this patent is extended or adjusted under 35 U.S.C. 154(b) by 54 days.

(21) Appl. No.: 12/870,264

(22) Filed: Aug. 27, 2010

(65) Prior Publication Data

US 2012/0048209 A1 Mar. 1, 2012

(51) Int. Cl.
*A01K 29/00* (2006.01)

(52) U.S. Cl. ......................................... 119/676; 119/673

(58) Field of Classification Search .................. 119/673, 119/600, 603, 753, 676, 671, 678, 69.5, 61.5; 4/495, 571.1, 572.2, 554, 573.1, 656, 659
See application file for complete search history.

(56) References Cited

U.S. PATENT DOCUMENTS

| 1,512,068 | A | * | 10/1924 | Thornburg | 4/572.1 |
|---|---|---|---|---|---|
| 2,438,979 | A | | 4/1948 | Short | |
| 3,130,709 | A | | 4/1964 | Rothberg | |
| 3,742,965 | A | * | 7/1973 | Hudziak | 134/92 |
| 4,316,433 | A | * | 2/1982 | Hebert | 119/673 |
| 4,881,281 | A | * | 11/1989 | Lavoine et al. | 4/572.1 |
| 5,009,196 | A | | 4/1991 | Young | |
| 5,259,339 | A | | 11/1993 | McLaughlin | |
| 5,678,511 | A | * | 10/1997 | Day | 119/676 |
| 5,794,570 | A | * | 8/1998 | Foster et al. | 119/756 |
| 5,974,601 | A | | 11/1999 | Drane et al. | |
| 6,079,368 | A | | 6/2000 | Paddock | |
| 6,153,237 | A | * | 11/2000 | Ferguson | 426/115 |
| 6,886,191 | B2 | * | 5/2005 | Zolotnik | 4/622 |
| 6,925,964 | B2 | | 8/2005 | Jeffery | |
| 6,988,467 | B1 | | 1/2006 | Smith | |
| 2006/0186014 | A1 | * | 8/2006 | Ramanujam et al. | 206/508 |
| 2007/0079766 | A1 | | 4/2007 | Park | |
| 2009/0008405 | A1 | * | 1/2009 | Mathus et al. | 221/197 |

* cited by examiner

*Primary Examiner* — Kristen C Hayes
(74) *Attorney, Agent, or Firm* — Shoemaker and Mattare

(57) ABSTRACT

A bathing tub for pets includes a basin with lateral wings projecting from opposite sides. The wings are useful as handles and work surfaces, and engage the rim of a sink into which the tub is placed to prevent the tub from tipping. One or more interchangeable elements can be snapped into the center of the basin to construct a mound assembly in the center of the basin of the proper height for a particular animal; the mound height can be changed, by adding or removing elements, for other animals. While being bathed, the pet stands in the basin with its feet straddling the mound; this prevents the pet from sitting or lying down in the tub. Restraining straps may be applied through slots in the tub to keep the animal in a correct position.

6 Claims, 5 Drawing Sheets

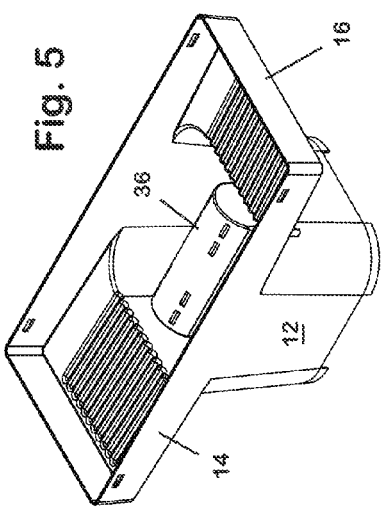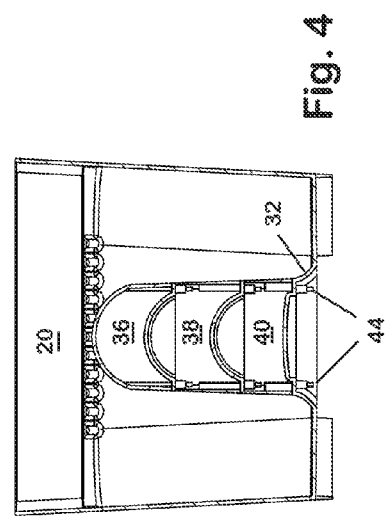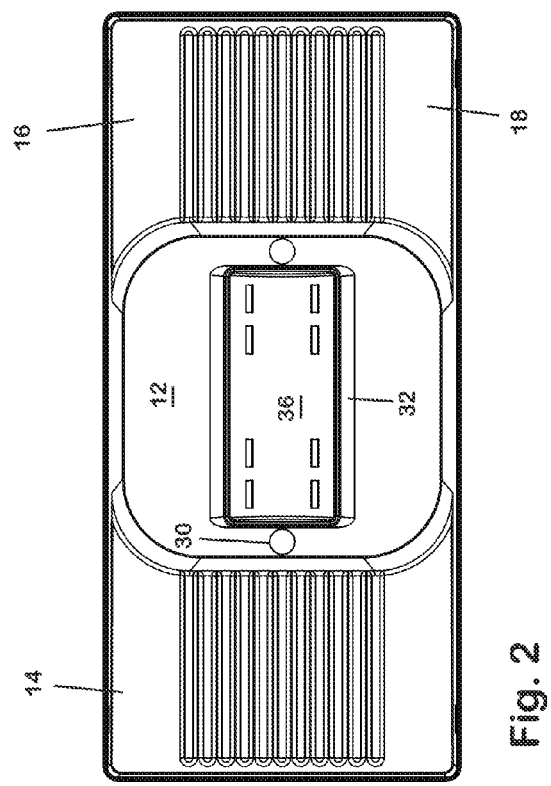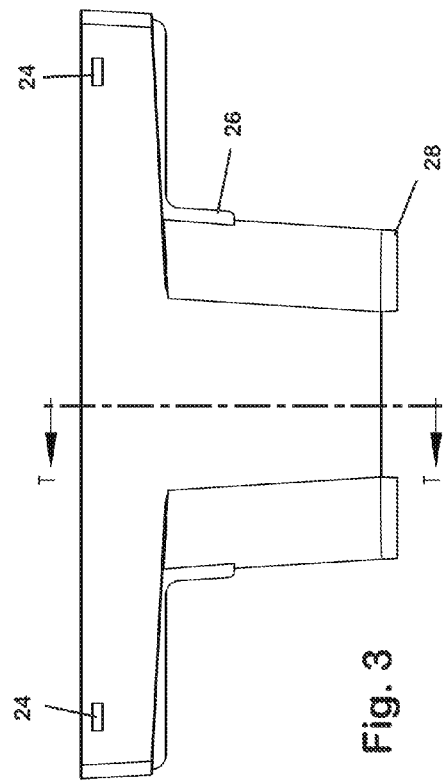

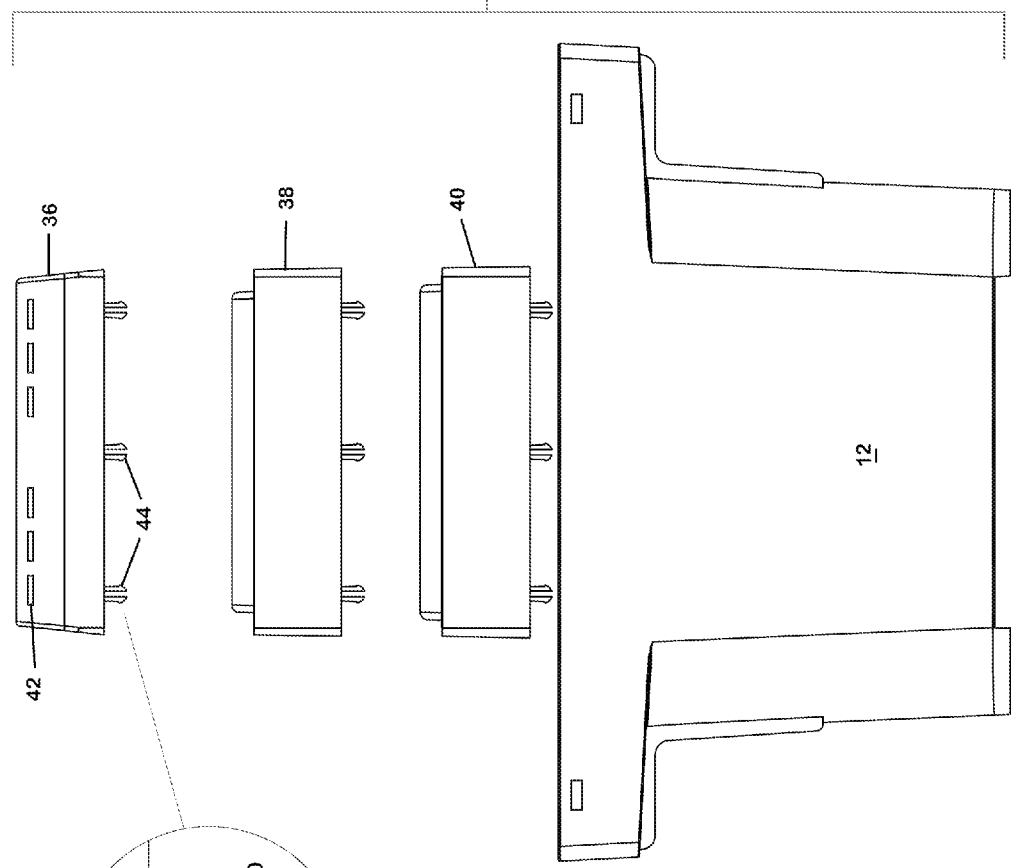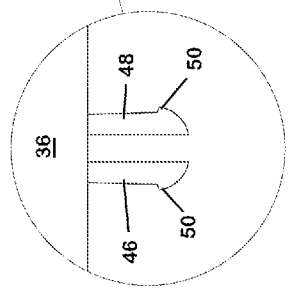

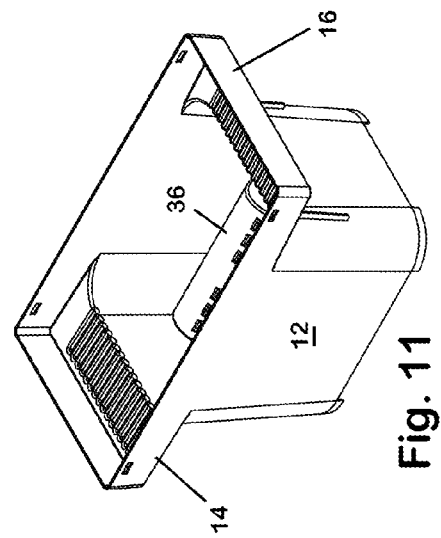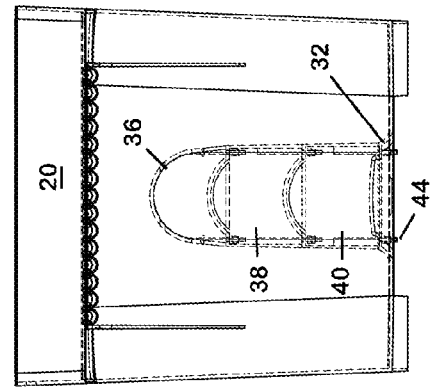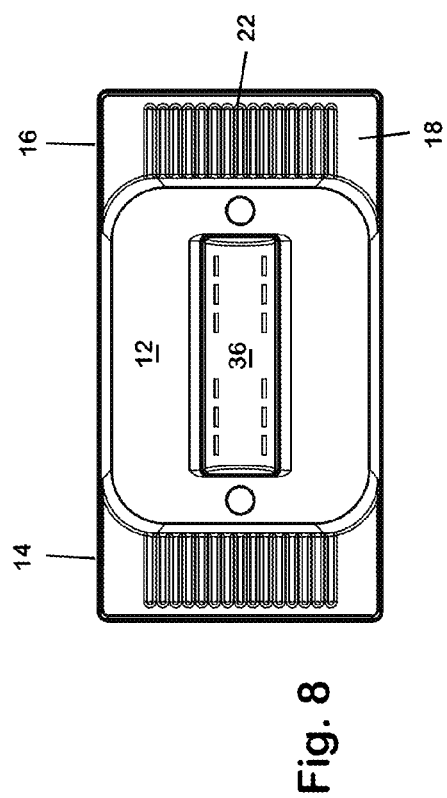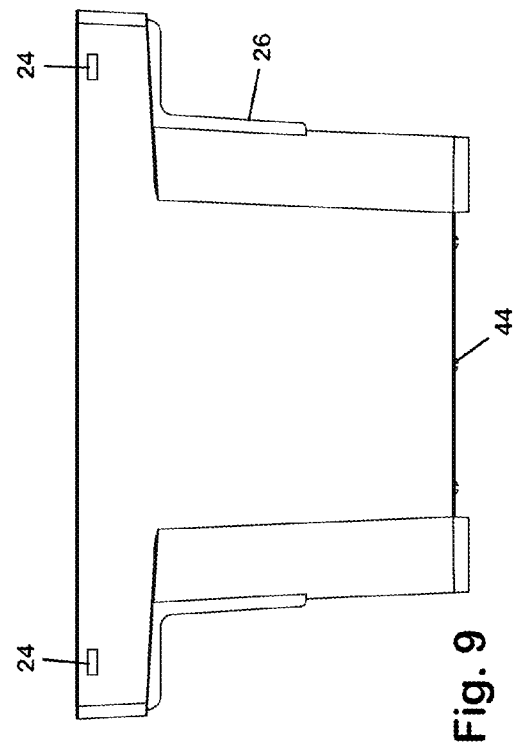

BATHING TUB FOR PETS

BACKGROUND OF THE INVENTION

This invention relates to pet bathing tubs, and more specifically to tubs designed to be inserted into a sink, and to restrain a pet securely as it is bathed.

Prior inventors have proposed a number of devices to contain an animal such as a household pet while it is being washed. In U.S. Pat. No. 5,678,511, for example, Day provided a molded basin whose floor had a central hump or mound to prevent an animal from sitting down while it was in the basin. The tub also had slots in the walls of the basin through which pet restraints could be passed.

A problem with Day's device was that it was not adjustable: one of Day's tubs would have been suitable only for pets of a particular size. It would be much more useful to have a tub which could be easily modified to accommodate pets of substantially different sizes. Then pet owners could purchase a single tub with the assurance they could continue to use it as their pets grew, or as new pets came into the family.

A shortcoming of all known prior devices is that they were designed as free-standing units which could tip over while they were being used. A more stable pet washing tub would reduce the likelihood of spills and possibly injurious accidents.

SUMMARY OF THE INVENTION

An object of the invention is to provide a wash tub which can be inserted into a kitchen sink, bathtub or laundry sink, and is particularly adapted to restrain pets safely while they are being washed.

Another object is to provide a pet wash tub specifically designed to engage the sink structure to stabilize the tub while it is in use.

A further object is to provide a tub having interchangeable parts which can be assembled to create central mounds of different heights so as to accommodate pets of different sizes.

These and other objects are attained by a pet bathing tub, two embodiments of which are illustrated and described below.

BRIEF DESCRIPTION OF THE DRAWINGS

In the accompanying drawings,

FIG. 2 is a top plan view thereof;

FIG. 3 is a front elevation thereof, the rear elevation being identical;

FIG. 4 is a sectional view taken on the plane T-T in FIG. 3;

FIG. 5 an unexploded perspective view thereof;

FIG. 6 is an exploded front elevation thereof, showing mound elements which can be snapped into the tub's basin or stacked on other elements;

FIG. 7 is an enlargement of a portion of FIG. 6; and

FIG. 8 is a top plan view of a modified, larger, form of the invention;

FIG. 9 is a front elevation thereof;

FIG. 10 is a right side elevation thereof;

FIG. 11 is a perspective view thereof; and

DESCRIPTION OF THE PREFERRED EMBODIMENT

Figure 1:
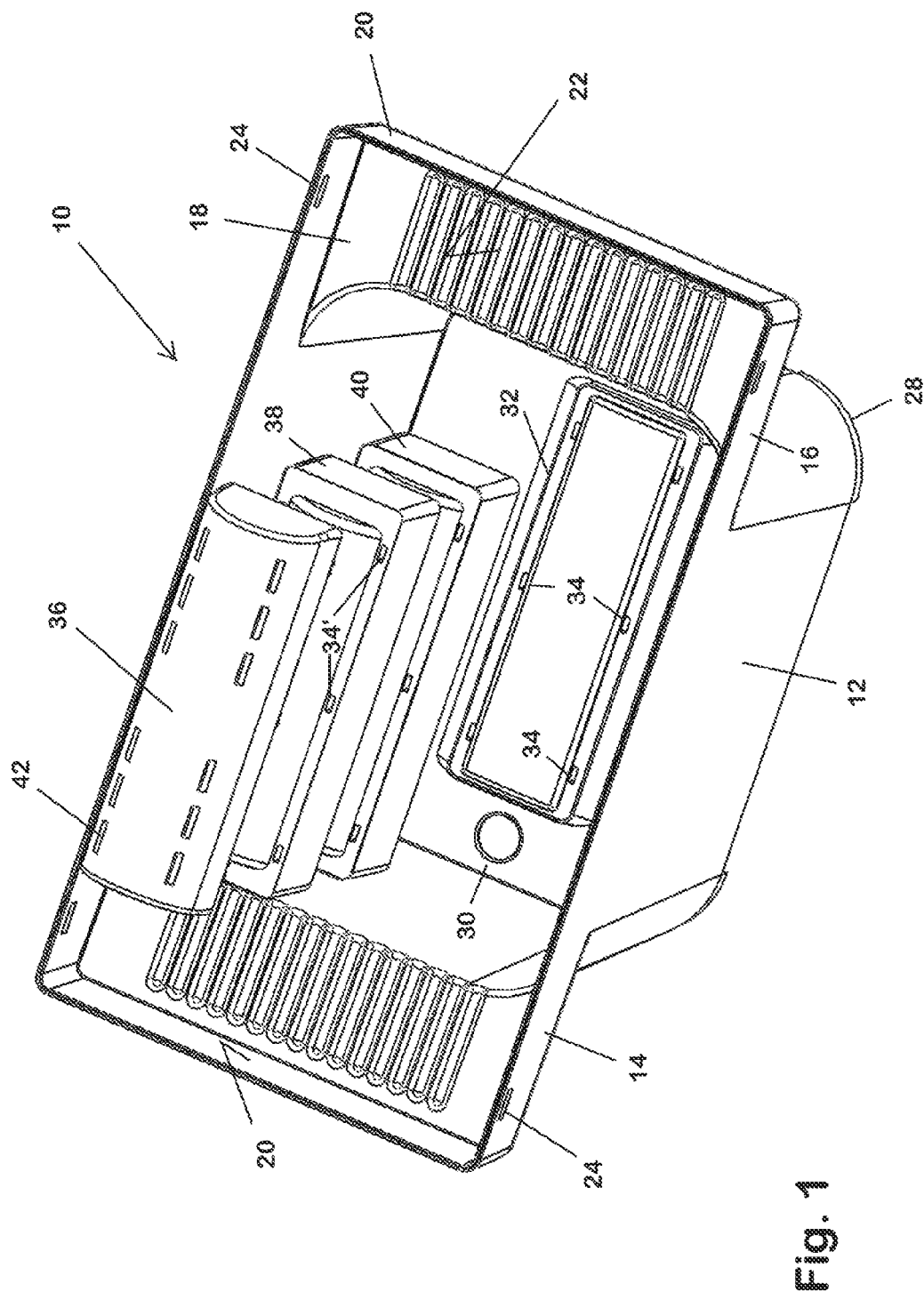
FIG. 1 is an unexploded perspective view of a pet bathing tub embodying the invention.

A bathing tub for pets, as shown in FIGS. 1-6, includes a basin 10, which is preferably injection molded in a single piece from a thermoplastic polymer such as polypropylene or polyethylene. The basin 10 comprises a basin 12 and a pair of wings 14, 16, which extend from the basin in opposite directions, serve as handles, tub stabilizers, and drainage tables and holding surfaces for tools and supplies.

Each of the wings forms a substantially horizontal work surface 18, which is surrounded on three sides by a substantially vertical flange 20. The work surface has a ribbed or corrugated central portion 22, and drains into the basin 12. Slots 24 are formed in the flange 20 so that restraining straps or ties may be run through the slots to restrain the animal's head.

As best seen in FIGS. 3 and 4, reinforcing gussets or ribs 26 are formed at the intersection of the wings and the basin, to either side of the central portion 22. The ribs 26 also improve stackability of the tubs by preventing wedging of adjacent units.

The wings 14, 16 stabilize the tub when it is placed in a sink by engaging the rim or top surface of the sink. The distance from the bottom of the wings to the bottom of the basin is chosen to prevent the bottom of the basin from resting on the floor of the sink. However, to facilitate use in particularly shallow sinks, or for use outdoors or on flat surfaces, the basin is provided with four short feet 28. The feet stably support the tub in such situations, and operate as standoffs so that the water outlet holes 30 (visible in FIG. 1) are not obstructed from below. The holes 30 are normally filled by rubber plugs which can be pulled to drain water from the tub.

In FIGS. 2 and 4, one can see a receptacle 32 of rectangular shape centered in and formed as a boss extending upward slightly from the floor of the basin. An array of eight slots 34 is formed in the receptacle, to receive tabs of stackable elements described below.

A mound of desired height can be constructed at the center of the floor of the basin from a plurality of stackable mound elements 36, 38, 40 (FIG. 1) which are provided with the basin as a kit. One of the elements 36, which must be installed at the top of the stack, has a smooth upper surface which is rounded, e.g. in a hemicylindrical shape, so that the assembled mound does not present any sharp exposed edges or uncomfortable corners. The top element 36 also has an array of slots 42. Retaining straps, preferably having Velcro-type fasteners, can be passed through the slots 42 and around the animal's torso to keep him in place.

The lower elements 38, 40 are interchangeable and stackable, and may have different heights. They enable one to construct mounds of various heights within the basin, to fit animals of different sizes. Each of the lower elements has slots 34' in its upper surface, arranged in a pattern identical to that of the slots 34 in the receptacle 32, and every element has a corresponding array of tabs 44 for seating in the slots of the element below it.

As shown in FIGS. 6 and 7, each tab 44 comprises a pair of tines 46, 48, and each tine has an outer barb 50. The distance between the barb tips is greater than the length of the slots 34, 34' so that there is an interference fit and the tines are driven together slightly when the tabs are inserted into the slots. Preferably, the slots are undercut so that the barbs snap in behind the slots and thereby resist inadvertent disassembly.

Figure 12:
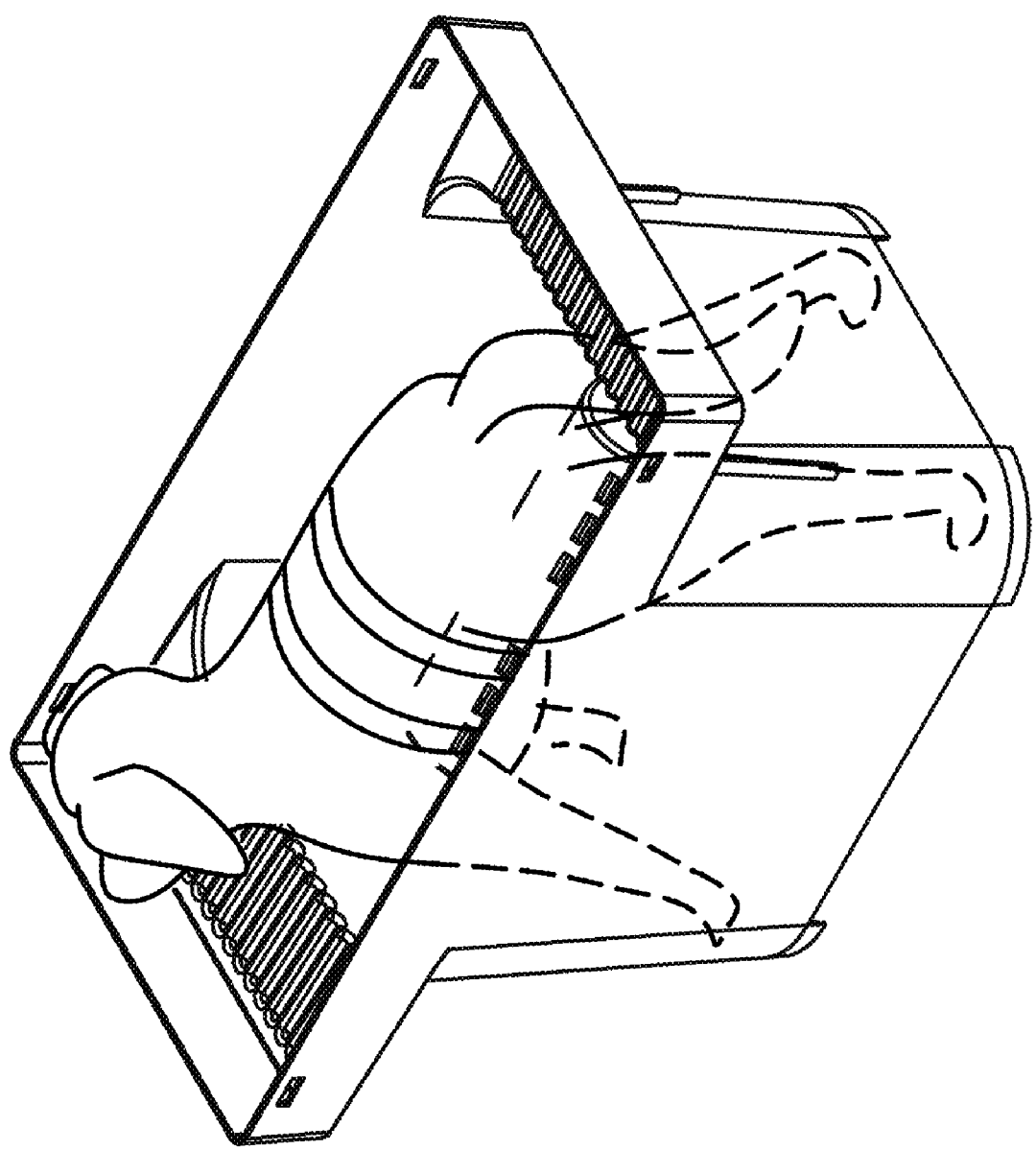
FIG. 12 shows the bathing tub in use.

In use, after a mound of the desired height has been assembled in the basin, an animal (FIG. 12) is placed in the tub, with its legs straddling the mound assembly. Restraining body straps are applied, if desired, by passing them through the slots 24 on one side of the basin, between the front and rear legs of the animal, and through the slots 42 in the upper mound element 36, to the slots 24 on the opposite side of the basin. The body straps, in conjunction with the mound assembly and the head retaining strap (if used) prevent the animal from sitting, rolling or twisting in the tub. As the animal is washed and rinsed, the wash water is kept in the basin until the plugs 31 are removed. After the basin contents have drained into the sink, the tub may be removed from the sink, using the wings 14, 16 as handles to lift the tub.

FIGS. 8-11 show an alternative version of the invention, which differs from that described above only in its dimensions and proportions; this version being suitable for larger animals. Whereas the embodiment of FIGS. 1-7 is designed to fit in a kitchen sink and to accommodate pets weighing up to about twenty pounds, the second embodiment fits better in a bathtub, or a laundry or utility room sink, and is designed to accommodate larger pets, weighing up to about fifty pounds. The structural elements and operation are otherwise the same as previously described.

It should be understood that the invention is subject to variations from the particular embodiment described above. For example, different materials might be used, and the dimensions and proportions of the device may be changed, without departing from the inventive concept.

Since the invention is subject to modifications and variations, it is intended that the foregoing description and the accompanying drawings shall be interpreted as only illustrative of the invention defined by the following claims.

I claim:

1. A bathing tub for pets, said tub comprising
a basin having a floor,
a receptacle formed in the floor, and
a plurality of interchangeable, stackable mound elements which can be assembled in various combinations to create a mound of a desired height attached to said receptacle, wherein
the basin has a pair of lateral wings projecting in opposite directions from its upper edge to provide work surfaces, to act as handles for the basin, and to support the tub when it is inserted in a sink and further comprising
gussets reinforcing each of said wings at their intersection with the basin.

2. A bathing tub for pets, said tub comprising
a basin having a floor,
a receptacle formed in the floor, and
a plurality of interchangeable, stackable mound elements which can be assembled in various combinations to create a mound of a desired height attached to said receptacle, wherein
the basin has a pair of lateral wings projecting in opposite directions from its upper edge to provide work surfaces, to act as handles for the basin, and to support the tub when it is inserted in a sink, wherein each of said lateral wings is surrounded on three sides by a substantially vertical flange, and further comprising
a plurality of slots formed in the vertical flange so that restraining straps or ties may be run through the slots to restrain an animal's head.

3. A bathing tub for pets, said tub comprising
a basin having a floor,
a receptacle formed in the floor, and
a plurality of interchangeable, stackable mound elements which can be assembled in various combinations to create a mound of a desired height attached to said receptacle, wherein
the receptacle comprises a plurality of slots formed in the floor of the basin, and each of the mound elements has a corresponding plurality of tabs which can be inserted in the respective slots.

4. The invention of claim 3, wherein a top one of the mound elements has a rounded upper surface free of sharp edges or corners.

5. The invention of claim 4, wherein each of the stackable mound elements, other than said top one of the mound elements has slots in its upper surface arranged in an array identical to that of the slots in the receptacle, and tabs arranged in a corresponding array, whereby mounds of different heights may be constructed to accommodate different pets.

6. The invention of claim 3, wherein
each of the tabs comprises a pair of tines, and
each tine has an outer barb, the distance between the barbs being greater than the length of the slot into which the tabs are inserted, so that the barbs have an interference fit in their slots and resist accidental disassembly of the mound.

* * * * *